(12) United States Patent
Hara (10) Patent No.: US 9,286,011 B2
(45) Date of Patent: Mar. 15, 2016

(54) IMAGE FORMATION DEVICE

(71) Applicant: KYOCERA Document Solutions Inc., Osaka (JP)

(72) Inventor: Nobuhiro Hara, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/647,585

(22) PCT Filed: Nov. 27, 2013

(86) PCT No.: PCT/JP2013/081904
§ 371 (c)(1),
(2) Date: May 27, 2015

(87) PCT Pub. No.: WO2014/084258
PCT Pub. Date: Jun. 5, 2014

(65) Prior Publication Data
US 2015/0309758 A1     Oct. 29, 2015

(30) Foreign Application Priority Data
Nov. 28, 2012  (JP) .................... 2012-259672

(51) Int. Cl.
*G06F 3/12* (2006.01)
*B41J 29/38* (2006.01)
*H04N 1/00* (2006.01)
*H04N 1/32* (2006.01)

(52) U.S. Cl.
CPC .............. *G06F 3/1243* (2013.01); *B41J 29/38* (2013.01); *G06F 3/12* (2013.01); *G06F 3/1204* (2013.01);
(Continued)

(58) Field of Classification Search
CPC .................................................. G06F 3/1243

USPC .................................................. 358/1.15, 1.13
See application file for complete search history.

(56) References Cited

U.S. PATENT DOCUMENTS

| | | | |
|---|---|---|---|
| 8,508,781 | B2 | 8/2013 | Yaguchi et al. |
| 2011/0069352 | A1 | 3/2011 | Yaguchi et al. |

FOREIGN PATENT DOCUMENTS

| | | |
|---|---|---|
| JP | H08-115280 A | 5/1996 |
| JP | 2000-163244 A | 6/2000 |

(Continued)

OTHER PUBLICATIONS

International Search Report mailed by Japan Patent Office on Mar. 4, 2014 in the corresponding PCT patent application No. PCT/JP2013/081904—5 pages.
PCT/ISA/237 (JP only) mailed by Japan Patent Office on Mar. 4, 2014 in the corresponding PCT patent application No. PCT/JP2013/081904—4 pages.

*Primary Examiner* — Jacky X Zheng (57) ABSTRACT

An image formation device includes a document box, an operating section, a version check control section, a document data update control section, and a print control section. When receiving a select operation, the version check control section determines whether or not a selected piece of document data has been updated on an external server. If the selected data has been updated on the external server, the document data update control section downloads an updated piece of document data from the external server and updates the piece of document data in the document box. When receiving a print instruction operation, the print control section causes printing based on the piece of document data already stored in the document box if the selected piece of document data has not been updated or causes printing based on the updated piece of document data if the selected piece of document data has been updated.

4 Claims, 6 Drawing Sheets

(52) U.S. Cl.
CPC ............ *G06F 3/1215* (2013.01); *G06F 3/1265* (2013.01); *G06F 3/1285* (2013.01); *H04N 1/00244* (2013.01); *H04N 1/00339* (2013.01); *H04N 1/32101* (2013.01); *H04N 2201/0094* (2013.01); *H04N 2201/3214* (2013.01); *H04N 2201/3215* (2013.01); *H04N 2201/3226* (2013.01); *H04N 2201/3249* (2013.01)

(56) References Cited

FOREIGN PATENT DOCUMENTS

| | | | |
|---|---|---|---|
| JP | 2004-302649 A | | 10/2004 |
| JP | 2008-293352 A | | 12/2008 |
| JP | 2008293352 A | * | 12/2008 |
| JP | 2009-100101 A | | 5/2009 |
| JP | 2011-066741 A | | 3/2011 |

\* cited by examiner

Fig.2

| BOX NUMBER | DOCUMENT DATA NAME | VERSION INFORMATION | DOWNLOAD URL |
|---|---|---|---|
| 001 | DOCUMENT A | 2012.09.08 | http://aa.bb.cc |
| 001 | DOCUMENT B | 2012.10.10 | http://dd.ee.ff |
| 001 | DOCUMENT C | 2012.10.19 | http://gg.hh.ii |
| 002 | DOCUMENT D | 2012.10.15 | http://jj.kk.ll |
| 002 | DOCUMENT E | 2012.09.25 | http://mm.nn.oo |

Fig.3

DEVICE A

| DOCUMENT DATA NAME | DOWNLOAD URL |
| --- | --- |
| DOCUMENT A | http://aa.bb.cc |
| DOCUMENT B | http://dd.ee.ff |
| DOCUMENT D | http://jj.kk.ll |
| DOCUMENT F | http://pp.qq.rr |
| DOCUMENT G | http://ss.tt.uu |

DEVICE B

| DOCUMENT DATA NAME | DOWNLOAD URL |
| --- | --- |
| DOCUMENT A | http://aa.bb.cc |
| DOCUMENT C | http://gg.hh.ii |
| DOCUMENT E | http://mm.nn.oo |
| DOCUMENT G | http://ss.tt.uu |
| DOCUMENT H | http://vv.ww.xx |

IMAGE FORMATION DEVICE

TECHNICAL FIELD

The present invention relates to image formation devices including the function of receiving document data via a network.

BACKGROUND ART

There have recently been image formation devices including a document box with function of storing pieces of document data and a network communication with function of downloading a piece of document data existing on an external server on the Internet. Such an image formation device keeps downloaded pieces of document data stored in a document box and performs printing of them as needed. In this case, because no updates of the pieces of document data made on the external server side are reflected on the pieces of document data downloaded to and stored in the document box, the old versions of the pieces of document data may be printed as they are even though the pieces of document data on the external server side have been updated. To cope with this, it has been proposed to check, by polling at regular intervals, the updated times and dates of the pieces of document data represented by link information and, if a renewed piece of document data is detected and if necessary, download the renewed piece of document data again (see Patent Literature 1).

CITATION LIST

Patent Literature

Patent Literature 1: JP-A-2009-100101

SUMMARY OF INVENTION

However, since in the above technique the updated times and dates are checked at regular intervals, the above technique still has the problem that, if printing is performed after an update of a piece of document data on the external server side and prior to the timing to check the updated times and dates, the old version of the piece of document data is printed as it is without reflection of the update of the piece of document data on the external server side.

The present invention has been made in view of the foregoing points and an object thereof is to provide an image formation device that can certainly reflect updates of pieces of document data made on an external server side on pieces of document data downloaded to and stored in a document box.

An image formation device according to one aspect of the present invention includes a document box, an operating section, a version check control section, a document data update control section, and a print control section.

The document box is configured to store a piece of document data downloaded from an external server on the Internet.

The operating section is configured to receive a select operation for selecting the piece of document data in the document box and a print instruction operation for instructing to print the selected piece of document data.

The version check control section is configured to, when the operating section receives the select operation, determine whether or not the selected piece of document data has been updated on the external server.

The document data update control section is configured to, when the version check control section determines that the selected piece of document data has been updated on the external server, download the updated piece of document data from the external server and update the piece of document data in the document box.

The print control section is configured to, when the operating section receives the print instruction operation, cause printing based on the piece of document data already stored in the document box to be performed if the selected piece of document data has not been updated on the external server or cause printing based on the piece of document data updated in the document box by the document data update control section to be performed if the selected piece of document data has been updated on the external server.

According to the present invention, the piece of document data having become an old version at the stage of the select operation is updated to the latest version. Therefore, updates of pieces of document data made on the external server side can be certainly reflected on the pieces of document data downloaded to and stored in the document box. Furthermore, the effect can be achieved of preventing the old versions of the pieces of document data from being printed as they are and always performing printing based on the latest versions of the pieces of document data.

DESCRIPTION OF EMBODIMENTS

Next, a detailed description will be given of an embodiment of the present invention with reference to the drawings.

Figure 1:
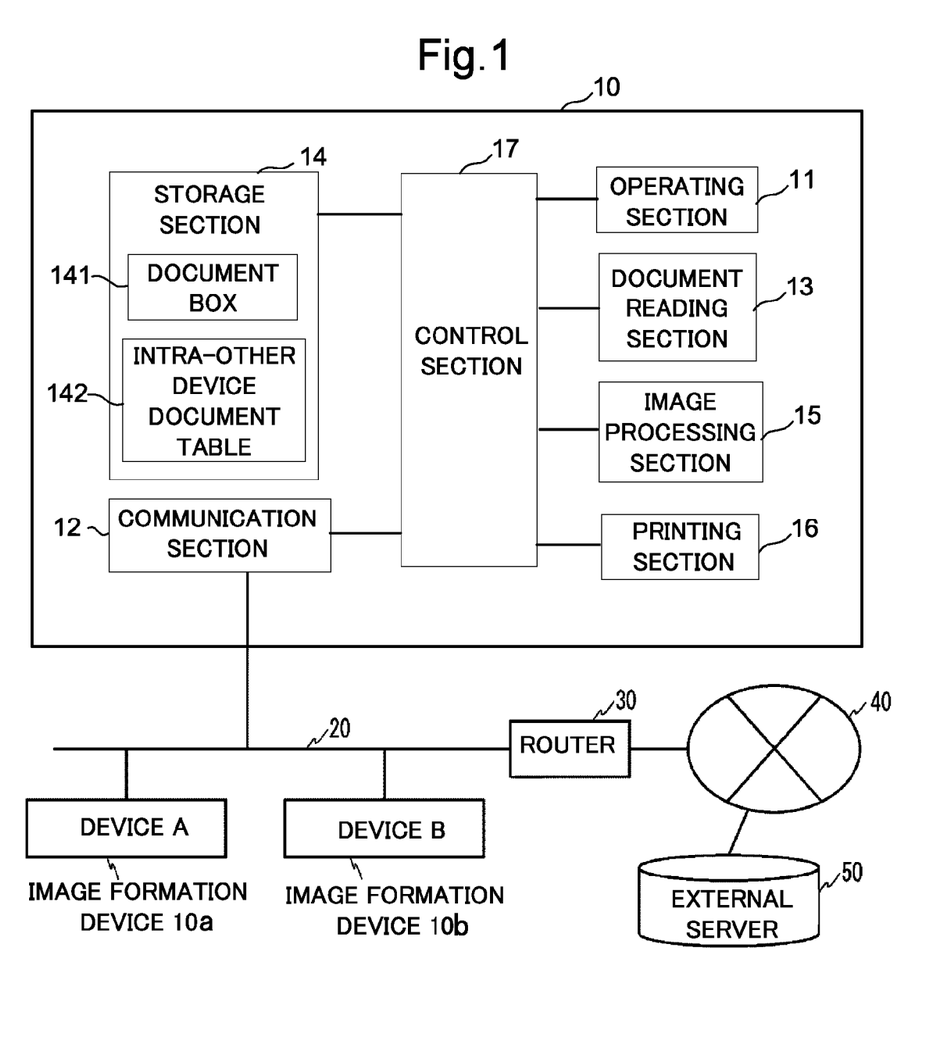
FIG. 1 is a block diagram showing a schematic configuration of an embodiment of an image formation device according to the present invention.

An image formation device 10 of an embodiment of the present invention is a multifunction peripheral having a copy function, a scan function, a network communication function, and other functions and includes, referring to FIG. 1, an operating section 11, a communication section 12, a document reading section 13, a storage section 14, an image processing section 15, a printing section 16, and a control section 17.

The operating section 11 is a user interface that includes: a touch panel in which a transparent pressure-sensitive sensor is provided at the surface of a liquid crystal display panel; a ten-key pad for use in entering numerical values, such as the number of print copies; and various operating keys, including a reset key for use in entering an instruction to initialize setting information, a stop key for use in stopping a copy operation or cancelling an entered numerical value, an interrupt key for use in instructing an interrupt copy, and a start key for use in entering an output instruction to start a printing operation.

The communication section 12 has the function of transmitting and receiving various types of data to and from other image formation devices 10a over a network 20, such as a LAN. Furthermore, the communication section 12 is configured to be connectable to the Internet 40 via the network 20 and a router 30. Also, the communication section 12 has the function of transmitting and receiving various types of data to and from an external server 50 on the Internet 40. Note that the image formation device 10 of this embodiment and the other image formation devices 10a are assumed herein to have the same functions.

The document reading section 13 is a scanner configured to irradiate an original document fed by an unshown original document feeder or an original document placed on top of a platen glass by the user with light and receiving the reflected light or the like to read an image of the original document.

The storage section 14 is a semiconductor memory, an HDD (hard disk drive) or so on, in which pieces of document data read by the document reading section 13 and pieces of document data received by the communication section 12 are stored. The document data in this embodiment is a generic term used to refer to document information formed of image data, text data, graphic data or any combination of them.

Furthermore, a document box 141 is configured in the storage section 14. The document box 141 is composed of a plurality of divided storage regions which are capable of storing pieces of document data and referred to as boxes. The boxes are managed using their respective different box numbers. The boxes can be configured on an arbitrary basis (for example, user-by-user or field-by-field) by the user.

Figure 2:
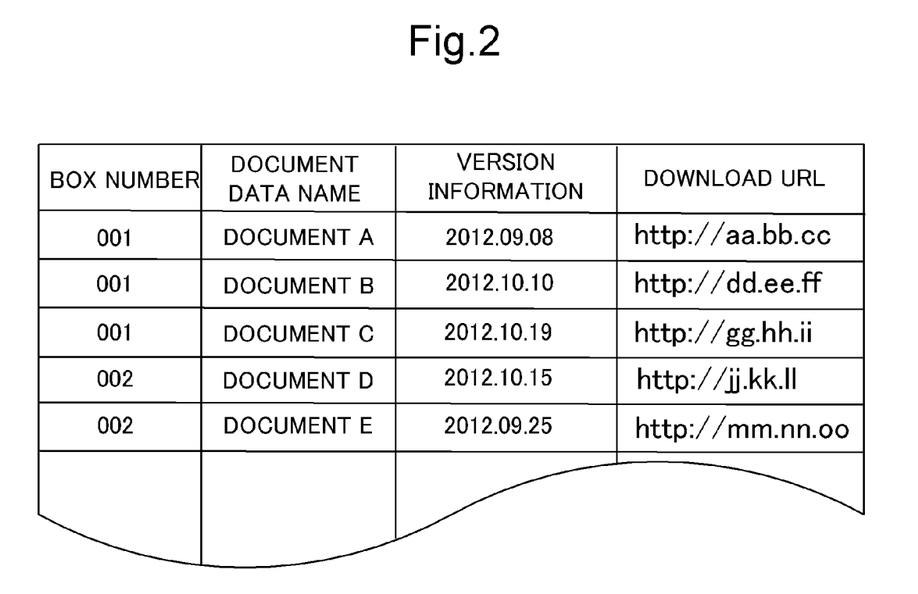
FIG. 2 is a chart showing an example of storage in a document box shown in FIG. 1.

The document box 141 can store pieces of document data downloaded from the external server 50 on the Internet 40 by the communication section 12. As shown in FIG. 2, downloaded pieces of document data are stored, together with their respective pieces of "Version Information" and their respective "Download URLs", in the document box 141. FIG. 2 shows an example where pieces of document data having respective "Document Data Names" of Document A, Document B, and Document C are stored, together with their respective pieces of "Version Information" and "Download URLs", in the box having a "Box Number" of 001 and pieces of document data having respective "Document Data Names" of Document D and Document E are stored, together with their respective pieces of "Version Information" and "Download URLs", in the box having a "Box Number" of 002. The piece of "Version Information" is a piece of information for use in determining whether or not the associated piece of document data on a download source has been updated. What can be used as a piece of "Version Information" is the updated time and date of the piece of document data as shown in FIG. 2 or a version number given by the download source. The "Download URL" refers to a piece of information indicating the address of the download source.

Figure 3:
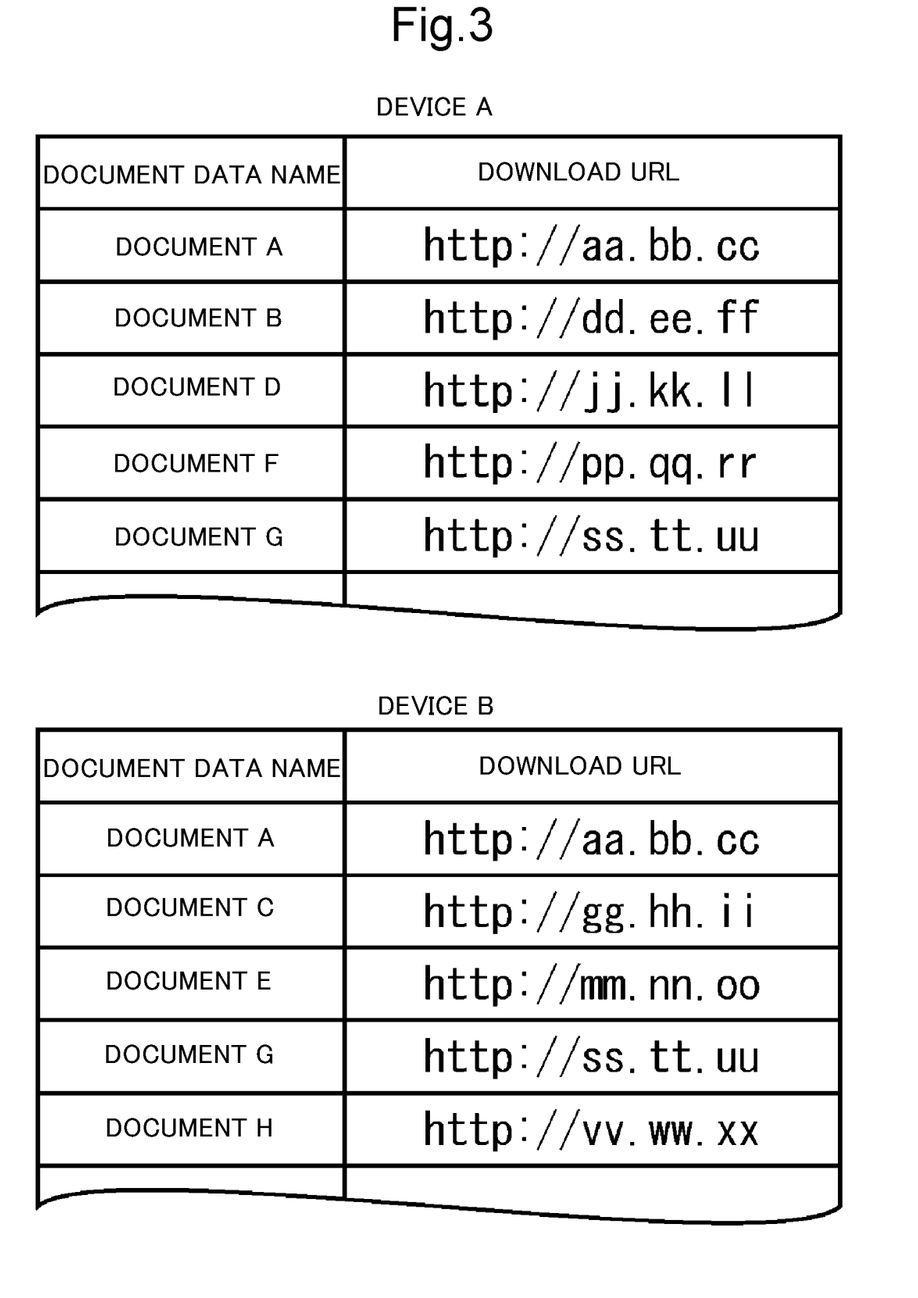
FIG. 3 is a chart showing an example of an intra-other device document table stored in a storage section shown in FIG. 1.

Furthermore, the storage section 14 also stores, as an intra-other device document table 142, "Document Data Names" and "Download URLs" stored in the document boxes 141 of the other image formation devices 10a connected over the network 20. FIG. 3 shows an example of the intra-other device document table 142 when "Device A" and Device B" are connected as other image formation devices 10a to the image formation device 10 of this embodiment.

The image processing section 15 is configured to subject a piece of document data to specified image processing. The image processing section 15 performs, for example, enlargement/reduction processing and image improvement processing, such as density adjustment and gradation adjustment.

The printing section 16 is configured to print a piece of document data stored in the storage section 14 as a document image. For example, the printing section 16 forms a latent image on the surface of a photosensitive drum based on the piece of document data read from the storage section 14, performs image formation by forming the latent image into a toner image using a toner, transfers the toner image from the photosensitive drum to a recording paper sheet, fixes the toner image on the recording paper sheet, and then discharges the recording paper sheet.

The control section 17 is connected to the operating section 11, the communication section 12, the document reading section 13, the storage section 14, the image processing section 15, and the printing section 16 and configured to take the overall operation control of the image formation device 10 according to information of a specified instruction input through the operating section 11. The control section 17 is an information processing section, such as a microcomputer, equipped with a ROM (read only memory), a RAM (random access memory), and so on. The ROM stores a control program for executing the operation control of the image formation device 10. The control section 17 is configured to take the overall control of the device according to information of the specified instruction input through the operating section 11 by reading the control program stored in the ROM and developing it in the RAM.

Next, a detailed description will be given of a document data storage operation for downloading a piece of document data from the external server 50 on the Internet 40 and storing it in the document box 141 with reference to FIG. 4.

Figure 4:
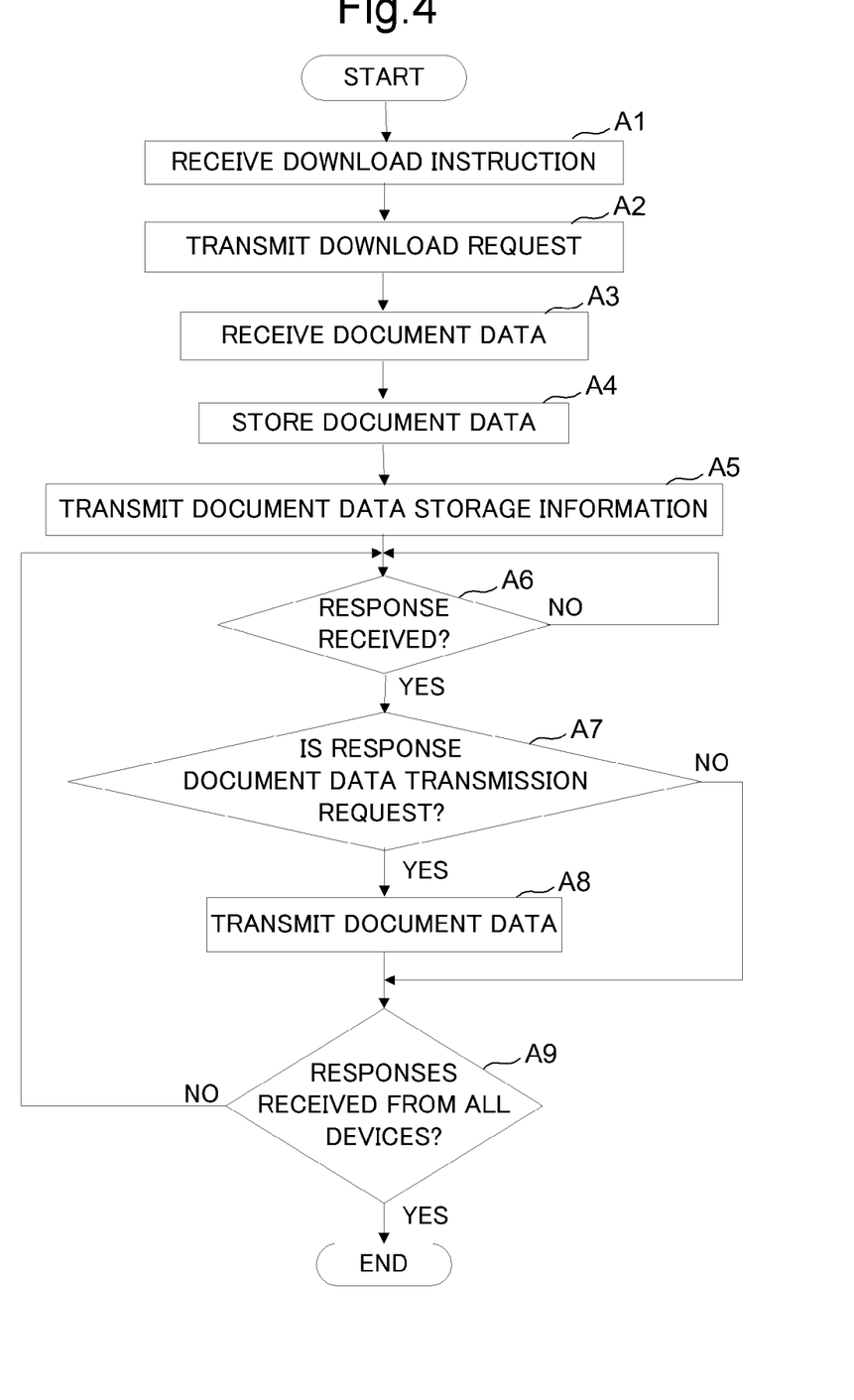
FIG. 4 is a flowchart for illustrating a document data storage operation in the embodiment of the image formation device according to the present invention.

Referring to FIG. 4, when the control section 17 receives through the operating section 11 a download instruction composed of the "Document Data Name" and the "Download URL" for a piece of document data to be downloaded (Step A1), the control section 17 transmits a download request via the communication section 12 to the external server 50 on the Internet 40 (Step A2).

Next, when receiving the downloaded piece of document data (Step A3), the control section 17 causes the document box 141 to store the received piece of document data (Step A4). Then, the control section 17 transmits document data storage information for notification of the piece of document data stored in Step A4 to the other image formation devices 10a connected over the network 20 (Step A5). The document data storage information is composed of a piece of information for identifying a newly downloaded piece of document data and a piece of information for identifying its version. In this embodiment, the document data storage information contains a "Document Name", a piece of "Version Information", and a "Download URL", wherein the "Document Name" and the "Download URL" form a piece of information for identifying the piece of document data and the piece of "Version Information" forms a piece of information for identifying the version.

Next, the control section 17 stands by for receiving responses to the transmitted document data storage information (Step A6). Then, upon receipt of a response to the document data storage information from the other image formation device, the control section 17 determines whether or not the response having received from the other image formation device is a data transmission request (Step A7). If in Step A7 the response is a data transmission request, the control section 17 transmits the piece of document data having received in Step A3 to the other image formation device 10a from which the control section 17 has received the data transmission request (Step A8).

Next, the control section 17 determines whether or not it has received responses from all the other image formation devices 10*a* connected over the network 20 (Step A9). If in Step A9 the control section 17 has received responses from all the other image formation devices 10*a*, the control section 17 ends an acknowledgment transmission operation. If in Step A9 the control section 17 has not received responses from all the other image formation devices 10*a*, the control section 17 returns to Step A6, in which it stands by for receiving responses to the transmitted document data storage information again.

On the other hand, if in Step A7 the response is not a data transmission request but merely a receipt acknowledgment, the control section 17 proceeds to Step A9, in which it determines whether or not to have received responses from all the other image formation devices 10*a* connected over the network 20.

Next, a detailed description will be given of the acknowledgment transmission operation upon receipt of the data storage information with reference to FIG. 5.

Figure 5:
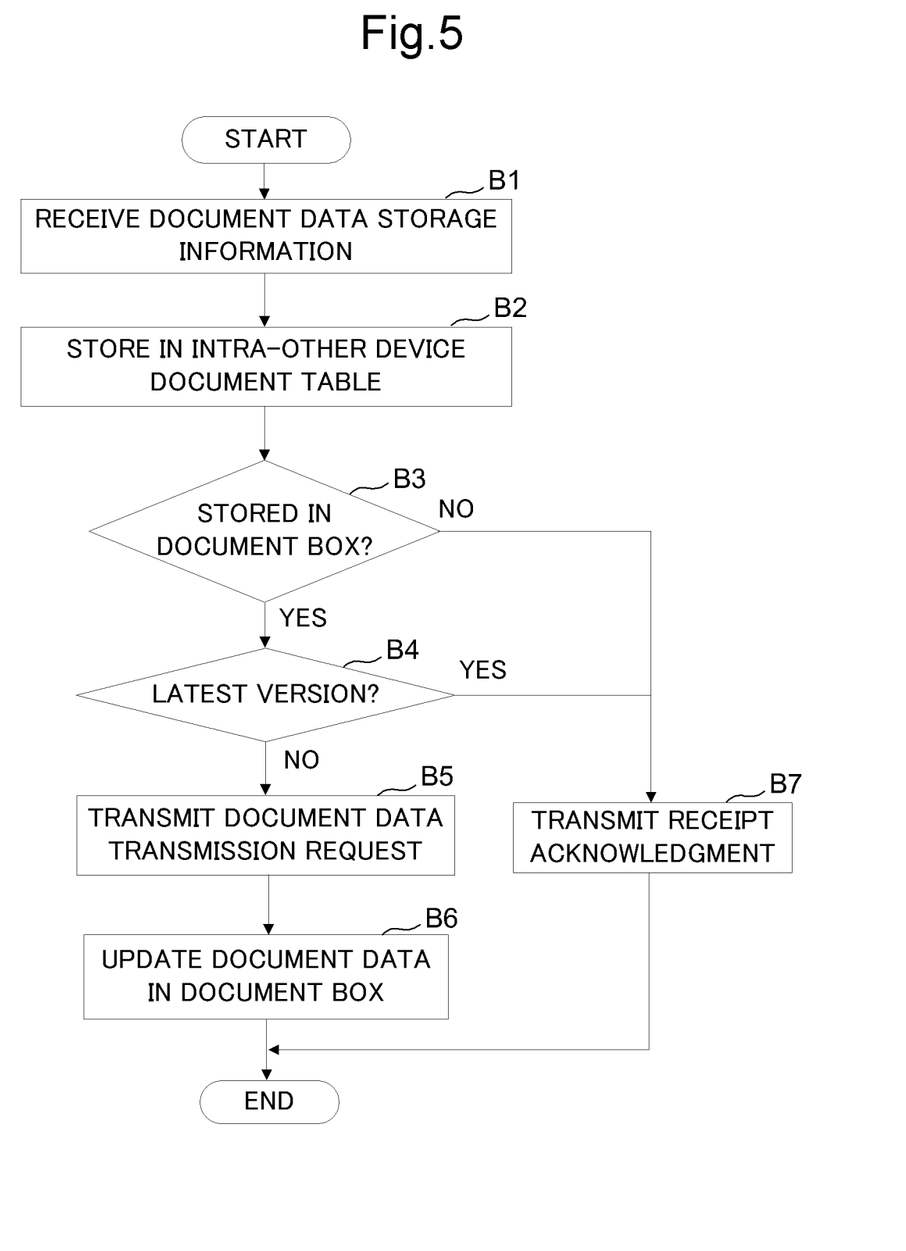
FIG. 5 is a flowchart for illustrating an acknowledgment transmission operation in the embodiment of the image formation device according to the present invention.

Referring to FIG. 5, when receiving document data storage information from the other image formation device 10*a* (Step B1), the control section 17 causes, based on the received document data storage information, the intra-other device document table 142 to store the "Document Name" and the "Download URL" of the piece of document data newly downloaded to the other image formation device 10*a* (Step B2). Thus, the intra-other device document table 142 enables the understanding of what pieces of document data are stored in the document boxes 141 of the other image formation devices 10*a*.

Next, the control section 17 determines, based on the "Document Name" and "Download URL" in the received document data storage information, whether or not an identical piece of document data is stored in the document box 141 (Step B3). If in Step B3 an identical piece of document data is stored in the document box 141, the control section 17 further determines, based on the piece of "Version Information" in the received document data storage information, whether or not the version is latest (Step B4).

If in Step B4 the version is not latest, the control section 17 transmits to the other image formation device 10*a* a document data transmission request for requesting to transmit the piece of document data newly downloaded to the other image formation device 10*a* (Step B5). Then, when receiving the piece of document data from the other image formation device 10*a*, the control section 17 updates the old version of the piece of document data stored in the document box 141 to the received piece of document data (Step B6) and ends the acknowledgment transmission operation.

On the other hand, if in Step B3 no identical piece of document data is stored in the document box 141 or if in step B4 the version is latest, the control section 17 merely transmits a receipt acknowledgment of the document storage information in Step B1 to the other image formation device 10*a* (Step B7) and then ends the acknowledgment transmission operation.

Figure 6:
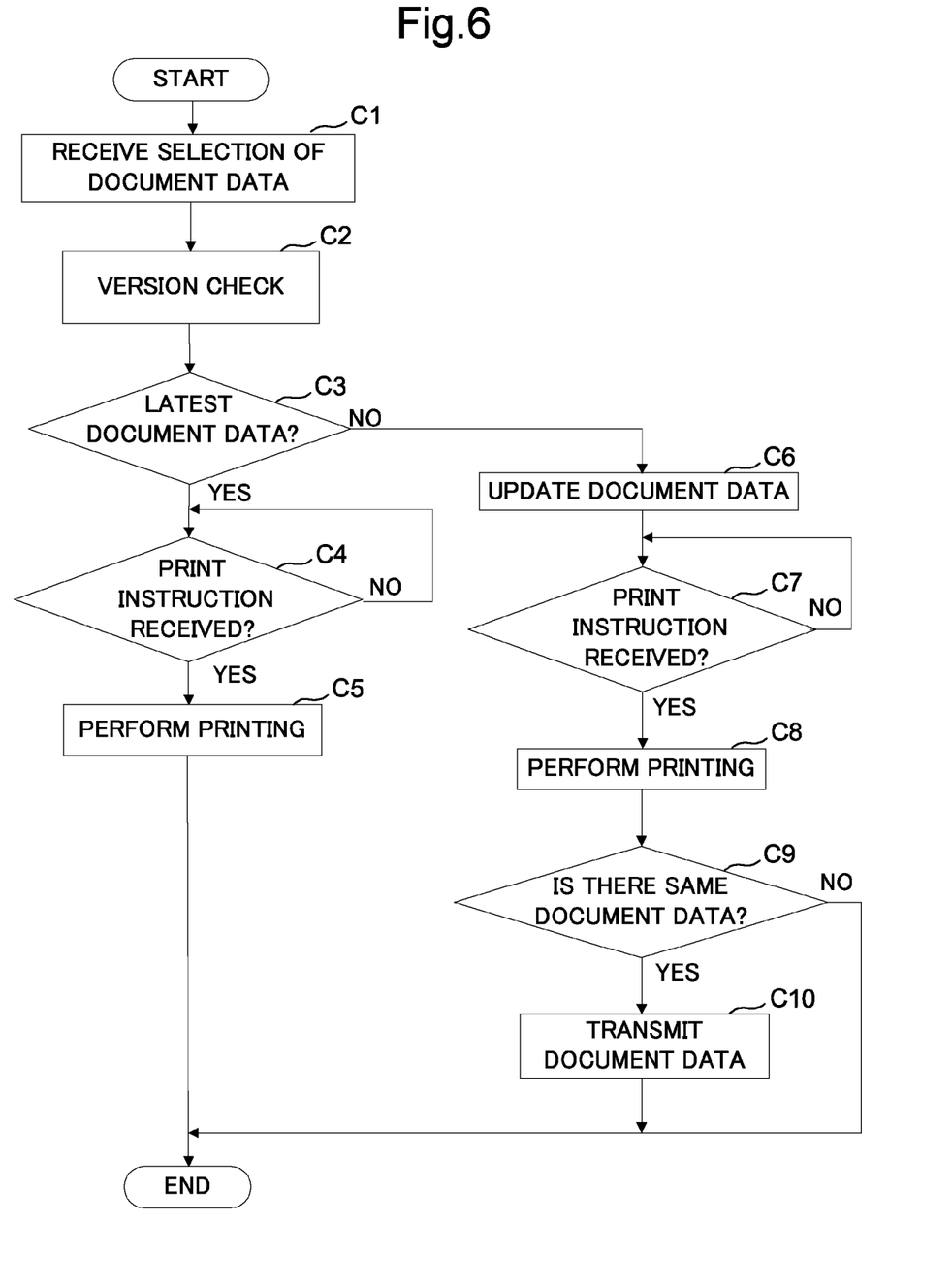
FIG. 6 is a flowchart for illustrating a document data printing operation in the embodiment of the image formation device according to the present invention.

Next, a detailed description will be given of a document data printing operation for printing a piece of document data stored in the document box 141 with reference to FIG. 6.

In printing a piece of document data in the document box 141, the operating section 11 generally receives a select operation for selecting the piece of document data in the document box and a print instruction operation for instructing to print the selected piece of document data. Referring to FIG. 6, when a piece of document data stored in the document box 141 is selected by a user's select operation on the operating section 11 (Step C1), the operating section 11 checks the version of the selected piece of document data (Step C2). In Step C2, the control section 17 checks the piece of "Version Information" about the piece of document data identified by the "Document Data Name" by accessing the external server 50 by the "Download URL". In other words, the control section 17 functions as a version check control section configured to, when a select operation is received by the operating section 11, determine whether or not the selected piece of document data has been updated on the external server 50.

Next, the control section 17 determines, based on the result of the version check in Step C2, whether or not the selected piece of document data is latest (Step C3). If in Step C3 the piece of document data is latest, the control section 17 stands by for receiving a print instruction through the operating section 11 (Step C4). Then, if in Step C4 the control section 17 has received a print instruction, it causes printing based on the piece of document data selected in Step C1 to be performed (Step C5) and then ends the document data printing operation.

If in Step C3 the piece of document data is not latest, the control section 17 downloads a latest piece of document data from the external server 50 and updates the piece of document data stored in the document box 141 to the latest piece of document data downloaded (Step C6). In other words, if the piece of document data selected by the select operation has been updated on the external server 50, the control section 17 functions as a document data update control section configured to download the updated piece of document data from the external server 50 and update the old version of the piece of document data in the document box 141.

Next, the control section 17 stands by for receiving a print instruction through the operating section 11 (Step C7). Then, if in Step C7 the control section 17 has received a print instruction, it causes printing based on the piece of document data downloaded and updated in Step C6 to be performed (Step C8). In other words, the control section 17 functions as a print control section configured to, when a print instruction operation is received by the operating section 11, cause printing based on the piece of document data already stored in the document box 141 to be performed if the selected piece of document data has not been updated on the external server 50 or cause printing based on the updated piece of document data in the document box 141 to be performed if the selected piece of document data has been updated on the external server 50. Thus, old versions of pieces of document data can be prevented from being printed as they are and printing based on the latest versions of the pieces of document data is always performed.

Next, the control section 17 determines, with reference to the intra-other device document table 142, whether or not the piece of document data downloaded and updated in Step C6 is stored in the document box 141 of any other image formation device 10*a* (Step C9). In other words, the control section 17 functions as an intra-other device document data check control section configured to determine whether or not the piece of document data identical in "Download URL" and "Document Data Name" to the downloaded piece of document data is stored in the document box 141 of any other image formation device 10*a* connected over the network 20.

If in Step C9 the updated piece of document data is not stored in the document box 141 of any other image formation device 10*a*, the control section 17 directly ends the document data printing operation. If in Step C9 the updated piece of document data is stored in the document box 141 of any other image formation device 10*a*, the control section 17 transmits the piece of document data downloaded and updated in Step C6 to the other image formation device 10*a* (Step C10) and then ends the document data printing operation. In other words, the control section 17 functions as a communication control section configured to transmit the downloaded piece of document data to the other image formation device 10a in which the piece of document data identical in download source and document data name to the downloaded piece of document data is stored in the document box 141.

The piece of document data transmitted in Step C10 is stored as an updated piece of document data in the document box 141 of the other image formation device 10a. Thus, when, in any of the image formation devices 10, 10a connected to each other over the network 20, a piece of document data in the document box 141 is updated, the update is reflected on all the image formation devices 10, 10a. Therefore, the download frequency of a piece of document data prior to printing can be reduced, thus increasing the operability.

In printing a piece of document data in a document box, a select operation for selecting the piece of document data in the document box and a print instruction operation for instructing to print the selected piece of document data are generally needed as user's operations. The version check in Step C2 is performed at the stage of the select operation. Therefore, the version check is in many cases completed before the print instruction operation, so that when the piece of document data is latest, the user can be prevented from being subjected to temporal stress.

As described previously, in this embodiment, the control section 17 functions, when a select operation is received by the operating section 11, as the version check control section to determine whether or not the selected piece of document data has been updated on the external server 50, functions, if the selected piece of document data has been updated on the external server 50, as the document data update control section to download the updated piece of document data from the external server 50 and update the piece of document data in the document box 141, and functions, when a print instruction operation is received by the operating section 11, as the print control section to cause printing based on the piece of document data already stored in the document box 141 to be performed if the selected piece of document data has not been updated on the external server 50 or cause printing based on the updated piece of document data in the document box 141 to be performed if the selected piece of document data has been updated on the external server 50. Owing to this configuration, the old version of the piece of document data is updated to the latest version at the stage of the select operation. Therefore, the old version of the piece of document data can be prevented from being printed as it is and printing based on the latest version of the piece of document data is always performed. Furthermore, since the version check is performed at the stage of the select operation, the version check is in many cases completed before the print instruction operation, so that when the piece of document data is latest, the user can be prevented from being subjected to temporal stress.

Moreover, in this embodiment, the control section 17 also functions as the intra-other device document data check control section to determine whether or not the piece of document data identical in "Download URL" and "Document Data Name" to the downloaded piece of document data is stored in the document box 141 of any other image formation device 10a connected over the network 20, and also functions as the communication control section to transmit the downloaded piece of document data to the other image formation device 10a in which the piece of document data identical in "Download URL" and "Document Data Name" to the downloaded piece of document data is stored in the document box 141. In addition, when receiving a piece of document data from the other image formation device 10a connected over the network 20, the control section 17 functions as the document data update control section to update the piece of document data stored in the document box and having the same "Download URL" and "Document Data Name" as the received piece of document data to the received piece of document data. Owing to this configuration, when, in any of the image formation devices 10, 10a connected to each other over the network 20, a piece of document data in the document box 141 is updated, the update is reflected on all the image formation devices 10, 10a.

It is obvious that the present invention is not limited to the above embodiment and the embodiment can be appropriately modified within the scope of the technological concept of the present invention.

The invention claimed is:

1. An image formation device including a document box configured to store a piece of document data downloaded from an external server on the Internet, the image formation device comprising:
    an operating section configured to receive a select operation for selecting the piece of document data in the document box and a print instruction operation for instructing to print the selected piece of document data;
    a version check control section configured to, when the operating section receives the select operation, determine whether or not the selected piece of document data has been updated on the external server;
    a document data update control section configured to, when the version check control section determines that the selected piece of document data has been updated on the external server, download the updated piece of document data from the external server and update the piece of document data in the document box;
    a print control section configured to, when the operating section receives the print instruction operation, cause printing based on the piece of document data already stored in the document box to be performed if the selected piece of document data has not been updated on the external server or cause printing based on the piece of document data updated in the document box by the document data update control section to be performed if the selected piece of document data has been updated on the external server;
    an intra-other device document data check control section configured to determine whether or not the piece of document data identical in download source and document data name to the piece of document data downloaded by the document data update control section is stored in the document box of any other image formation device connected over a network to the image formation device; and
    a communication control section configured to transmit the piece of document data downloaded by the document data update control section to the other image formation device in which the piece of document data identical in download source and document data name to the downloaded piece of document data is stored in the document box.

2. The image formation device according to claim 1, wherein
    the intra-other device document data check control section is configured to transmit, to the other image formation device, document data storage information indicating the download source and the document data name of the piece of document data downloaded by the document data update control section, and the communication control section is configured to transmit, when receiving a transmission request to transmit the piece of document data indicated by the document data storage information from the other image formation device to which the intra-other device document data check control section has transmitted the document data storage information, the piece of document data indicated by the document data storage information to the other image formation device having transmitted the transmission request and avoid, when receiving a receipt acknowledgment of the transmission of the document data storage information from the other image formation device to which the document data storage information has been transmitted, the transmission of the piece of document data indicated by the document data storage information to the other image formation device.

3. The image formation device according to claim 2, wherein the communication control section is configured to, when receiving either the transmission request or the receipt acknowledgment from all the other image formation devices to which the document data storage information has been transmitted, end a control of the transmission of the piece of document data over all the other image formation devices.

4. The image formation device according to claim 1, wherein the document data update control section is configured to, when receiving the piece of document data from the other image formation device connected to the image formation device over the network, cause the piece of document data stored in the document box and having the same download source and document data name as the received piece of document data to be updated to the received piece of document data.

* * * * *